Dec. 14, 1971    M. R. HOWARD    3,626,779
GEAR AND METHOD FOR MAKING SUCH GEAR
Filed March 26, 1970
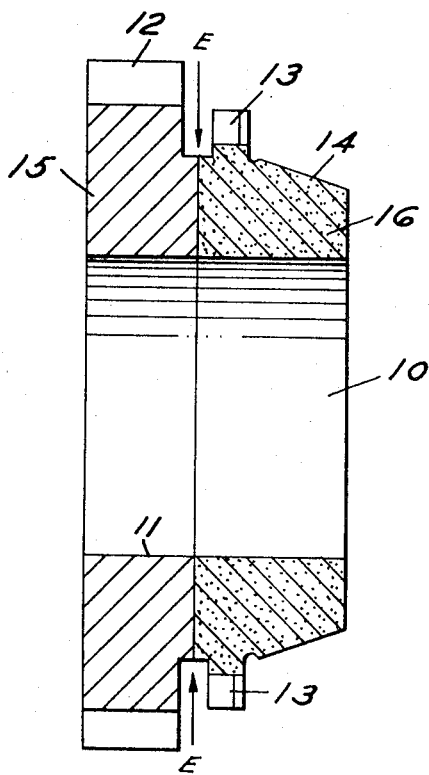
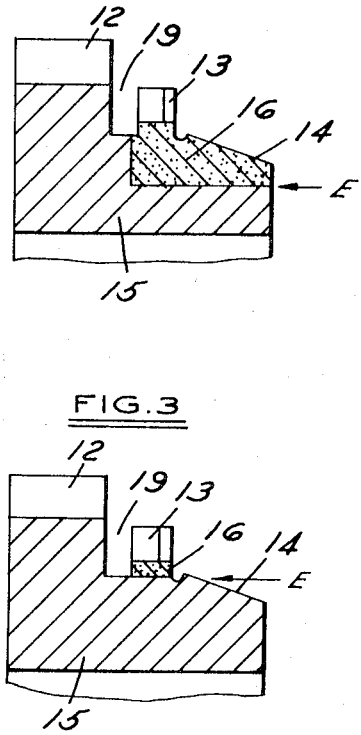
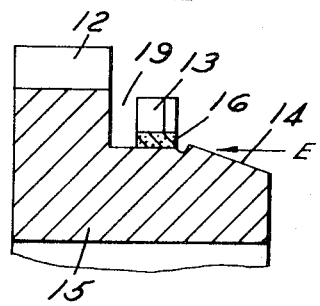
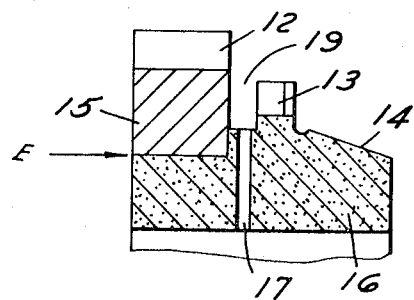
INVENTOR
MICHAEL R. HOWARD
BY
John R. Faulkner
Robert W. Brown
ATTORNEYS

United States Patent Office 3,626,779
Patented Dec. 14, 1971

3,626,779
GEAR AND METHOD FOR MAKING SUCH GEAR
Michael R. Howard, "Trojans" Great Oak,
Hutton Brentwood, Essex, England
Filed Mar. 26, 1970, Ser. No. 22,965
Claims priority, application Great Britain, Apr. 5, 1969, 17,811
Int. Cl. F16h 55/00
U.S. Cl. 74—431                                4 Claims

ABSTRACT OF THE DISCLOSURE

A gear formed from wrought and powdered metal, particularly a transmission gear, having gear teeth designed to engage a driving or driven gear and clutch teeth designed to couple the gear for rotation with the shaft on which it is freely mounted. Gear manufacturing method includes forming a first gear part with gear teeth from wrought metal, forming a second part from powdered metal and joining the two parts together.

---

This invention relates to gears of the kind which include both gear teeth and clutch teeth or splines. In use, the gear teeth are relatively heavily loaded because only one-and-a-half teeth are enmeshed, but the clutch teeth or splines are relatively lightly loaded because all the clutch teeth or splines are enmeshed when in use. Gears of this kind are currently wrought in a single piece and the gear teeth and clutch teeth or splines subsequently formed by complex and costly machining.

A new gear, and a method for making such gear, which eliminates the prior need for machining of clutch teeth or splines, has been developed by the inventor. According to the invention, a gear is comprised of two parts. The first part is formed from wrought or cast metal and is designed to be freely mounted on a shaft. The gear teeth are located on the outer or peripheral portion of this first part of the gear. The second part of the gear is made from powdered metal which is either sintered or sinter forged (powder forged) and includes the clutch teeth or splines on its outer surface or periphery. The second part will also have an axial central bore therein or it will be so designed that it may be mounted on the first part in such manner as to encircle the axial central bore in the first part. The first and second parts are joined together, preferably, along a plane extending perpendicularly to the axis of the annular first and second parts. Joining of the two parts may be accomplished by any suitable means, such as inertia welding, friction welding, electron beam welding, seam welding, or adhesive bonding.

According to the invention a method of making a gear of the kind described comprises forming a first part of the gear, including all the gear teeth, from wrought or cast metal; forming a second part of the gear, including all the clutch teeth or splines, from powdered metal by a sintering or powder forging process; and joining the two parts together. The method of the invention eliminates machining of the clutch teeth or splines which are of adequate strength when sintered or sinter forged. Thus the only machining required is on the gear teeth of the wrought or cast metal first part and the axial central bore thereof and on portions of the powdered metal second part which may be easily machined.

The method of the invention is particularly suitable for the manufacture of the synchromesh transmission gears for synchromesh assemblies in motor vehicle change speed gearboxes, but may be applied with advantage to many gears in which relatively heavily loaded gear teeth and relatively lightly loaded clutch teeth or splines are combined.

The invention will now be described with reference to the accompanying drawings, in which:

FIG. 1 is a sectional view of a main shaft gear for a synchromesh assembly in a motor vehicle change speed gear-box made by the method of the invention;

FIGS. 2 through 4 are sections of the transmission gear of FIG. 1 showing alternative joining lines between the wrought or cast metal first part and the sintered second part of the gear.

The transmission gear 10 illustrated in FIG. 1 is of a kind widely used in motor vehicle change speed gearboxes. In use, the gear 10 is freely mounted on a main shaft (not shown) which extends through the central bore 11. Helical gear teeth 12 are located on the periphery, the external surface, of the first part of the gear and are in constant mesh with a driven or driving gear on a layshaft, and dog clutch teeth 13 and synchromesh cone 14 cooperate with a dog clutch splined to the main shaft and a synchromesh baulk ring to selectively couple the gear 10 for rotation with the main shaft. As may be seen in FIG. 1, the clutch teeth 13 are located on the periphery of the second part of the gear and are of somewhat complex design when viewed from the standpoint of machining under prior art manufacturing methods.

The gear 10 is made in two parts. Several alternative dividing lines are possible as illustrated in the drawings. The central bore 11 may extend through both of the two parts as illustrated in FIG. 1, or, alternatively, the central bore may extend only through the first part having the gear teeth, such as shown in FIGS. 2 and 3 where the second part having the clutch teeth is mounted on the first part having the gear teeth. Also, the central bore 11 may extend only through the second part which has the clutch teeth, as is shown in FIG. 4. The important characteristics of these alternative divisions between the two parts is that the relatively heavily loaded gear teeth are in the first part 15 and the lightly loaded clutch teeth are in the second part 16.

The first part 15 is made of wrought or cast metal, preferably ferrous, by a conventional forging or casting process, and the gear teeth are subsequently machined or rolled. The second part 16 is made from powdered metal, also preferably ferrous, by sintering or powder forging so that final machining is minimized or possibly completely obviated. The two parts are then assembled together in a jig and are joined, preferably by electron beam welding, along the line E.

As shown in the drawings, a gap 19 is normally left between the gear teeth and clutch teeth to permit machining of the clutch teeth. With the method of the invenion, this gap is unnecessary and the axial length of the gear can be reduced permitting a reduction in the length and weight of a gearbox using such gears. Alternatively, the width of the drive gear teeth 12 can be increased to facilitate higher tooth loading.

The synchromesh cone 14 and the central bore 11 of the sintered or powder forged second part 16, if the bore 11 extends through this second part 16, may require to be finished by machining, but satisfactory clutch teeth can be produced by sintering without subsequent machining.

Case hardening of the gears may be carried out on one or both of the parts separately before welding, or on the two parts together after welding.

Lubrication channels 17 ( FIG. 4) may be formed in the sintered part 16 without machining.

What is claimed is:

1. A gear, which comprises: (a) a first part formed from wrought or cast metal and being generally annular in shape, said first part having an axial central bore therein and gear teeth formed in its peripheral portion; (b) a second part formed from powdered metal, and being generally annular in shape, said second part having an axial central bore therein and clutch teeth or splines formed in its peripheral portion, said second part being joined to said first part to thereby form the gear.

2. A gear in accordance with claim 1, wherein said second part is joined to said first part by welding.

3. A gear in accordance with claim 1, wherein said second part includes a synchromesh cone on the peripheral portion thereof.

4. A gear in accordance with claim 1, wherein said second part includes at least one unmachined lubrication channel extending from the central bore to the region of the clutch teeth or splines.

References Cited

UNITED STATES PATENTS

| | | | |
|---|---|---|---|
| 2,457,942 | 1/1949 | Van Zandt | 74—432 |
| 2,857,777 | 10/1958 | Porter | 74—432 |
| 106,429 | 8/1870 | Taylor | 74—439 |
| 1,415,542 | 5/1922 | Fuegel et al. | 74—432 |
| 2,533,669 | 12/1950 | Hollingsworth | 74—432 |
| 2,976,741 | 3/1961 | Martin | 74—432 |
| 3,191,453 | 6/1965 | Hoven | 74—432 |
| 3,396,596 | 8/1968 | Fischer | 74—432 |

C. J. HUSAR, Primary Examiner

U.S. Cl. X.R.

74—439; 29—159.2